United States Patent [19]

Marchant et al.

[11] E Re. 28,760

[45] Reissued Apr. 6, 1976

[54] PHOTOGRAPHIC ELEMENT INCLUDING SUPERIMPOSED SILVER HALIDE LAYERS OF DIFFERENT SPEEDS

[75] Inventors: John C. Marchant; Robert F. Motter, both of Rochester, N.Y.

[73] Assignee: Eastman Kodak Company, Rochester, N.Y.

[22] Filed: Aug. 20, 1975

[21] Appl. No.: 606,259

Related U.S. Patent Documents

Reissue of:

[64] Patent No.: 3,620,747
Issued: Nov. 16, 1971
Appl. No.: 730,593
Filed: May 20, 1968

[52] U.S. Cl. ..... 96/74; 96/68; 96/100
[51] Int. Cl.[2] ..... G03C 1/76; G03C 1/40
[58] Field of Search ..... 96/74, 68, 100

[56] References Cited

UNITED STATES PATENTS

| | | | |
|---|---|---|---|
| 3,035,913 | 5/1962 | Hellmig | 96/68 |
| 3,050,391 | 8/1962 | Thompson et al. | 96/68 |
| 3,148,062 | 9/1969 | Whitmore et al. | 96/100 |
| 3,227,550 | 1/1966 | Whitmore | 96/100 |
| 3,227,551 | 1/1966 | Barr et al. | 96/74 |
| 3,227,552 | 1/1966 | Whitmore | 96/100 |
| 3,243,294 | 3/1966 | Barr | 96/100 |
| 3,364,022 | 1/1968 | Barr | 96/100 |
| 3,450,536 | 6/1969 | Wyckoff | 96/68 |

*Primary Examiner*—Edward C. Kimlin
*Attorney, Agent, or Firm*—J. T. Lewis

[57] ABSTRACT

Photographic elements are provided which feature a support having coated thereon a first photographic silver halide emulsion layer containing image-forming coupler and development inhibitor-releasing coupler; and, a second silver halide emulsion layer containing photographic image-forming coupler, the second layer having a faster effective speed sensitivity than the first layer. Such elements have high contrast for faint images and an extended latitude of low contrast for bright images.

25 Claims, No Drawings

PHOTOGRAPHIC ELEMENT INCLUDING SUPERIMPOSED SILVER HALIDE LAYERS OF DIFFERENT SPEEDS

Matter enclosed in heavy brackets [ ] appears in the original patent but forms no part of this reissue specification; matter printed in italics indicates the additions made by reissue.

This invention relates to photographic elements, and more particularly to the photographic elements having wide exposure latitudes.

Photographic elements having wide exposure latitudes have previously been provided by coating fast and slow silver halide emulsion layers onto a support. See, for example, Beach British Patent 774,655 (published 1957) and Millikan British Patent 1,021,564 (published 1966). While such elements are highly useful for the purposes intended, they exhibit deficiencies when utilized in certain applications. In some instances, it is desirable to provide photographic elements having a high contrast for faint images and a long latitude of low contrast for bright images. Such elements would record images of vastly different intensities without the stronger image "flaring" or spreading so much that it obliterates the fainter image. One specific use of elements of this type would be in recording the events which take place when a satellite in orbit (having a very faint image) reenters the earth's atmosphere and burns out, producing a much stronger image. When the satellite first enters the atmosphere, the image is very faint, and a photographic element is needed which produces high contrast and exhibits high speed. This is necessary to record the low-contrast image which the satellite makes against the sky upon initial reentry. When the satellite commences to burn up in the earth's atmosphere, the image of the satellite is bright and has good contrast against the black sky. This brighter image should be recorded on a photographic element which exhibits low contrast and has a long exposure latitude. The prior art fails to teach how to obtain a photographic element which produces high contrast and high speed for faint images and low contrast with extended latitude for bright images. Prior art films have utterly failed in satisfactorily recording the faint image produced upon initial entry of an orbiting satellite into the earth's atmosphere. The image of the faint satellite upon initial reentry could not be measured because its image was obliterated by the flare produced by the stronger image of the burning satellite in the lower atmosphere. Heretofore, the amount of flare produced by the stronger image of the burning satellite has been used to measure indirectly the path and brightness of the satellite on initial stages of reentry.

One object of this invention is to provide novel photographic elements which have wide exposure latitude.

Another object of this invention is to provide photographic elements which exhibit low image spread over the useful exposure latitude.

A further object of this invention is to provide photographic elements which exhibit high contrast when exposed to faint images; and, low contrast and wide latitude when exposed to bright images having a dark background.

Other objects of this invention will be apparent from the disclosure herein and the appended claims.

In accordance with this invention, novel photographic elements are provided comprising a support having coated thereon a first photographic silver halide emulsion layer containing (1) nondiffusible photographic coupler which forms image dye and (2) a development inhibitor-releasing coupler; and, a second photographic silver halide emulsion layer containing nondiffusible photographic coupler which forms image dye, said second layer having a faster effective speed sensitivity than said first layer. The development inhibitor-releasing coupler in the slower image-recording layer effectively extends exposure latitude and reduces contrast. Such photographic elements have wide exposure latitude, and are capable of recording images of vastly different intensity in close geometrical proximity with minimal image spread. Photographic elements in accordance with this invention exhibit excellent sharpness. They produce high-contrast records of faint images and low-contrast records of bright images.

In accordance with another embodiment of this invention, a photographic element is provided as described above which contains a nonimage-forming, light-diffusing silver halide emulsion layer positioned between the support and the silver halide emulsion layers. Photographic elements in accordance with this embodiment of the invention exhibit reduced image spread.

In still another embodiment of this invention, an antihalation layer is provided between the support and the image recording layers The fast and slow silver halide emulsion image recording layers utilized in the photographic elements of this invention can comprise any suitable silver halide, such as silver bromide, silver iodide, silver chloride, or mixed halides such as silver bromoiodide or silver chlorobromide. The silver halide grains in the image-recording layers can be spectrally sensitized, for example when it is desired to expose the elements to radiation longer than blue radiation. Preferably, the silver halide grains of each image-recording layer are panchromatically sensitized. Any of the dyes suggested in the prior art spectrally sensitizing silver halide can be used in the practice of this invention. The silver halide grains used in the image recording layers are advantageously negative, developing-out silver halide grains.

The optimum speeds of the image-recording layers will depend upon the various uses to which the elements are put. Preferably, the speed sensitivity of the two layers overlaps. Good results are obtained when the effective speed of the slower image-recording layer is about 0.6 Log E to about 1.2 Log E slower than the fast image-recording layer. It is desirable that the faster silver halide emulsion layer have a detection capability in the region of about 5 quanta per square micron. Advantageously, the elements exhibit an exposure latitude of about $10^5$ over the reliable exposure latitude. The effective speeds of the emulsion layers can be regulated in any convenient manner, such as by use of silver halides of different grain size, chemical sensitizers, concentration of photographic coupler, etc. The fast and slow image-recording layers can be contiguous. Either the slow or the fast image-recording layers may be coated closest to the support, with the other emulsion layer coated thereover. In preferred embodiments, the slower emulsion layer is coated closest to the support, with the fast emulsion layer being coated thereover.

The term "photographic image-forming coupler" is used herein as a word of art and includes organic compounds which react with oxidized primary aromatic amine developing agents to form dye images. The photographic image-forming couplers, as well as the development inhibitor-releasing couplers which are utilized in the practice of this invention can embody any photographic coupler radical. Typical useful photographic coupler radicals include the 5-pyrazolone coupler radicals, the phenolic (including α-naphthol) coupler radicals, and the open-chain ketomethylene coupler radicals. As is well known in the art, 5-pyrazolone coupler radicals are customarily utilized for the formation of magenta dyes; phenolic coupler radicals are generally utilized for the formation of cyan color dyes; and, open-chain ketomethylene coupler radicals are generally utilized in the formation of yellow dyes. The coupling position of such coupler radicals is also well known in the art. The 5-pyrazolone coupler radicals couple at the carbon atom in the 4-position thereof; the phenolic coupler radicals couple at the carbon atom in the 4-position (relative to the hydroxyl group); and, the open-chain ketomethylene coupler radicals couple at the carbon atom forming the methylene moiety (e.g.,

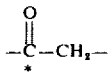

wherein * denotes the coupling position).

An especially useful class of open-chain ketomethylene coupler radicals are described in formula I below:

Formula I

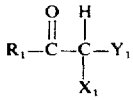

wherein $R_1$, $X_1$ and $Y_1$ represent substituents of the type used in open-chain ketomethylene couplers. For example, $R_1$ can represent an alkyl group (which can be substituted and preferably has from about six to 22 carbon atoms); an aryl group (preferably a phenyl or naphthyl group); or, a heterocyclic group (preferably a carbon containing heterocyclic radical which contains from five to six atoms in the heterocyclic ring, which ring contains at least one hetero-oxygen sulfur or nitrogen atom); $X_1$ can represent a member selected from the group consisting of cyano and carbamyl (which can be substituted); and, $Y_1$ can have a meaning given below for the image forming and development inhibitor-releasing couplers utilized herein.

The image forming and the development inhibitor-releasing couplers utilized in this invention can feature a 5-pyrazolone coupler radical having the following general formula:

Formula II

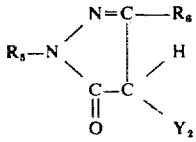

wherein $R_5$, $R_6$ and $Y_2$ represent substituents of the type used in 5-pyrazolone couplers, for example, $R_5$ can represent a value given for $R_1$; $R_6$ can represent a member selected from the group consisting of an alkyl group, a carbamyl group (which can be substituted), an amino group (which can be substituted with various groups such as one or two alkyl or aryl groups), an amido group, e.g., a benzamido group (which can be substituted), or an alkylamido group (which can be substituted), and, $Y_2$ can represent a value given below for the image forming and the development inhibitor-releasing couplers utilized herein.

The photographic image forming and development inhibitor-releasing couplers employed in the practice of this invention can utilize any suitable phenolic (including alphanaphtholic) coupler radicals, including those described in the structural formula below:

Formula III

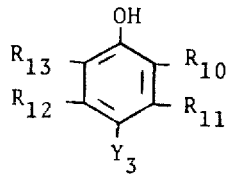

wherein $R_{10}$, $R_{11}$, $R_{12}$, $R_{13}$ and $Y_3$ can represent a substituent of the type used in phenolic couplers, for example, $R_{10}$ and $R_{11}$ each can represent a value given for $R_1$, and in addition can represent a member selected from the group consisting of hydrogen, amino, carbonamido, sulfonamido, sulfamyl, carbamyl, halogen and alkoxy, $R_{12}$ and $R_{13}$, when taken together, can represent the carbon atoms necessary to complete a benzo group, which benzo group can be substituted with any of the groups given for $R_{10}$ and $R_{11}$ and, when taken separately, $R_{12}$ and $R_{13}$ can each independently represent a value given for $R_{10}$ and $R_{11}$; and, $Y_3$ represents a value given below for the image forming and development inhibitor-releasing couplers utilized herein.

The image-forming couplers which can be utilized in the practice of this invention include the nondiffusible, open-chain, 5-pyrazolone and phenolic couplers referred to above, such as those couplers represented by formula I, II and III above wherein $Y_1$ and $Y_2$ each represents a group of the type used in colorless image-forming couplers, such as hydrogen or a coupling off group, e.g., halogen, such as a chlorine or a fluorine atom; a thiocyano group; an acyloxy group, for example, an alkolyloxy group which can be substituted, or an aryloxy group which can be substituted, or a heterocycloyloxy group which can be substituted; a cyclooxy group including an aryloxy group, e.g., phenoxy, naphthoxy, or a heterocyclooxy group, such as a pyridinyloxy group, a tetrahydropyranyloxy group, a tetrahydroquinolyloxy group, etc., and, an alkoxy group; and, $Y_3$ can represent any value given for $Y_1$ and $Y_2$ except an aryloxy group, and in addition $Y_3$ can also represent a cycloimido group (e.g., a maleimido group, a succinimido group, a 1,2-dicarboximido group, a phthalimido group, etc.) when $R_{12}$ and $R_{13}$ are taken together to form a benzo group. The various groups which $Y_1$, $Y_2$ and $Y_3$ can represent may include groups such as:

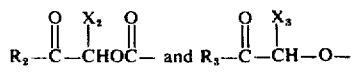

wherein $R_2$ and $R_3$ have a meaning given for $R_1$, and $X_2$ and $X_3$ each having a meaning given for $X_1$.

Especially good results are obtained when the image-forming coupler is colorless; it can, however, be colored if desired. It will be understood that the "image-forming coupler" does not release a development inhibitor.

The useful image-forming couplers include both the four-equivalent and two-equivalent nondiffusing couplers. Typical useful four-equivalent yellow dry-forming couplers which can be utilized in this invention include the following:

1. N-amyl-p-benzoylacetaminobenzenesulfonate
2. N-(4-anisolyacetaminobenzenesulfonyl)-N-benzyl-m-toluidine
3. N-(4-benzoylacetaminobenzenesulfonyl)-N-benzyl-aniline
4. ω-(p-benzoylbenzoyl)acetaniline
5. ω-benzoyl-p-sec.-amylacetaniline
6. N,N'-di(ω-benzoylacetyl)-p-phenylenediamine
7. α-{3-[α-(2,4-di-tert-amylphenoxy)butyramido]-benzoyl}-2-methoxyacetaniline
8. 4,4'-di-(acetoacetamino)-3,3'-dimethyldiphenyl
9. p,p'-di-(acetoacetamino)diphenylmethane
10. nonyl-p-benzoylacetaminobenzenesulfonate
11. N-phenyl-N'-(p-acetoacetaminophenyl)urea
12. n-propyl-p-benzoylacetaminobenzenesulfonate acetoacetpiperidide
13. N-(ω-benzoylacetyl)-1,2,3,5-tetrahydroquinoline
14. N-(ω-benzoylacetyl)morpholine The two-equivalent yellow dye-forming couplers can be derived from corresponding parent four-equivalent couplers by replacing one of the two hydrogens on the alpha-carbon (i.e., methylene) with any nonchromophoric coupling off group, including coupling off groups such as the fluorine atom, the chlorine atom, an acyloxy group, a cyclooxy group and a thiocyano group. Typically useful two-equivalent couplers include the alpha-fluoro couplers of U.S. Pat. No. 3,277,155, the alpha-chloro couplers of U.S. Pat. No. 2,778,658, the alpha-thiocyano couplers of U.S. Pat. No. 3,253,924, the alpha-acyloxy grouplers of Loria U.S. Pat. application 477,353, filed July 26, 1965, the alpha-cyclooxy couplers of Loria U.S. Pat. application 469,887, filed July 6, 1965, and the alpha-alkoxy couplers of the type shown in Whitmore et al. U.S. Pat. No. 3,227,550.

Typical useful two-equivalent yellow-forming open-chain ketomethylene couplers include the following:

1. 4-(α-2'-methoxybenzoyl-α-chloroacetamido)-3''-(4'''-tert.-amylphenoxy)benzanilide
2. α-o-methoxybenzoyl-α-chloro-4-[α-(2,4-di-tert-amylphenoxy)-n-butyramido]-acetanilide
3. α-{3-[α-(2,4-di-tert-amylphenoxy)butyramido]-benzoyl}-α-fluoro-2-methoxyacetanilide
4. α-fluoro-α-pivalyl-5-[γ-(2,4-di-tert-amylphenoxy)butyramido]-2-chloroacetanilide
5. α-acetoxy-α-{3-[γ-(2,4-di-tert-amylphenoxy)-butyramido]benzoy}2-methoxyacetanilide
6. α-benzoyl-α-[α-(2,4-di-n-amylphenoxy)acetoxy]-2-methoxyacetanilide
7. α-pivalyl-α-stearoyloxy-4-sulfamylacetanilide
8. α-pivalyl-α-[α-(3-pentadecylphenoxy)acetoxy]-3,5-diamyloxyacetanilide
9. α-acetoxy-α-{3-[α-(2,4-di-tert-amylphenoxy)-butyramido]benzoyl}-2-methoxyacetanilide
10. α-(3-dodecanamidobenzoyl)-α-octanoyloxy-2-methoxy-acetanilide
11. α-{3-[γ-(2,4-di-tert-amylphenoxy)butyramido]-benzoyl}-α(4-nitrophenoxy)-2-methoxyacetanilide
12. α-[4-(N-methyl-N-octadecylsulfamyl)phenoxy]-α-pivalyl-4-octylacetanilide potassium salt
13. α-pivalyl-α-(4-sulfophenoxy-4-(N-methyl-N-octadecyl-sulfamyl)acetanilide potassium salt
14. α-[4-(4-hydroxyphenylsulfonyl)phenoxy]-α-pivalyl-2-chloro-5-[γ-(2,4-di-tert-amylphenoxy)-butyramido]acetanilide
15. 4,4'-bis[α-pivalyl-α-{2-chloro-5-[γ-(2,4-di-tert-amylphenoxy)butyramido]phenylcarbamyl}methoxy]-diphenylsulfone
16. α-benzoyl-α-thiocyanoacetanilide Specific representative four-equivalent magenta dye-forming couplers which can be used in this invention include the following:

1. 1-p-sec.-amylphenyl-3-n-amyl-5-pyrazolone
2. 2-cyanoacetyl-5-(p-sec.-amylbenzoylamino) coumarone
3. 2-cyanoacetylcoumarone-5-(N-n-amyl-p-tert.-amylsulfanilide)
4. 2-cyanoacetylcoumarone-5-sulfon-N-n-butylanilide
5. 2-cyanoacetyl-5-benzoylamino-coumarone
6. 2-cyanoacetylcoumarone-5-sulfondimethylamide
7. 2-cyanoacetylcoumarone-5-sulfon-N-methylanilide
8. 2-cyanoacetylcoumarone-5-(N-γ-phenylpropyl)-p-tert.-amylsulfonanilide
9. 1-p-laurylphenyl-3-methyl-5-pyrazolone
10. 1-β-naphthyl-3-amyl-5-pyrazolone
11. 1-p-nitrophenyl-3-n-amyl-5-pyrazolone
12. 1-p-phenoxyphenyl-3-n-amyl-5-pyrazolone
13. 1-phenyl-3-n-amyl-5-pyrazolone
14. 1,4-phenylene bis-3-(1-phenyl-5-pyrazolone)
15. 1-phenyl-3-acetylamino-5-pyrazolone
16. 1-phenyl-3-n-valerylamino-5-pyrazolone
17. 1-phenyl-3-chloroacetylamino-5-pyrazolone
18. 1-phenyl-3-benzoylamino-5-pyrazolone
19. 1-phenyl-3-(m-aminobenzoyl)amino-5-pyrazolone
20. 1-phenyl-3-(p-sec.-amylbenzoylamino)-5-pyrazolone
21. 1-phenyl-3-diamylbenzoylamino-5-pyrazolone
22. 1-phenyl-3-β-naphthoylamino-5-pyrazolone
23. 1-phenyl-3-phenylcarbamylamino-5-pyrazolone
24. 1-phenyl-3-palmitylamino-5-pyrazolone
25. 1-phenyl-3-benzenesulfonylamino-5-pyrazolone
26. 1-(p-phenoxyphenyl)-3-(p-tert-amyloxybenzoyl-)amino-5-pyrazolone
27. 1-(2',4',6'-trichlorophenyl)-3-benzamido-5-pyrazolone
28. 1-(2',4',6'-tribromophenyl)-3-phenylacetamido-5-pyrazolone
29. 1-(2',4'-dichlorophenyl)-3-[3''-(2''',4'''-di-tert-amylphenoxyacetamido)benzamido]-5-pyrazolone
30. 1-(2',4',6'-trichlorophenyl)-3-[3''-(2''',4'''-di-tert.-amylphenoxyacetamido)benzamido]-5-pyrazolone
31. 1-(2',4',6'-trichlorophenyl)-3-[β-2''',4'''-di-tert.-amylphenoxy)-propionamido]-5-pyrazolone
32. 1-(2',5'-dichloro)-3-[3''-(4'''-tert.-amylphenoxy)benzamido]-5-pyrazolone
33. 1-(2',4',6'-tribromophenyl)-3-[3''-(4'''-tert.-amylphenoxy)-benzamido]-5-pyrazolone
34. 1-(2',5'-dichlorophenyl)-3-[3''-(2''',4'''-di-tert.-amylphenoxyacetamido)benzamido]-5-pyrazolone The two-equivalent 5-pyrazolone couplers can be derived from the parent four-equivalent 5-pyrazolone couplers by replacing one of the hydrogens on the carbon in the 4-position of the pyrazolone ring with a nonchromophoric coupling off group. Examples of coupling off groups which can be used in two-equivalent magenta-forming 5-pyrazolone couplers are the thiocyano group illustrated by the couplers in Loria U.S. Pat. No. 3,252,924 and the acyloxy group containing 2-equivalent magenta-forming couplers of Loria U.S. Pat. No. 3,311,476. Other useful coupling off groups include acyloxy, aryloxy, alkoxy such as any of those shown in Whitmore et al. U.S. Pat. No. 3,227,550, the chlorine atom, the fluorine atom, and the sulfo group.

Typical two-equivalent magenta dye-forming couplers which can be used in this invention include the following:

1. 1-(2,4,6-trichlorophenyl)-3-(4-nitroanilino)-4-stearoyloxy-5-pyrazolone
2. 1-(2,4,6-trichlorophenyl)-3-{3-[α-(2,4-di-tert-amylphenoxy)-acetamido]-benzamido}-4-acetoxy-5-pyrazolone
3. 1-(2,4,6-trichlorophenyl)-3-pentadecyl-4-thiocyano-5-pyrazolone
4. 1-(2,4,6-trichlorophenyl)-3-[3-(2,4-di-tert-amylphenoxyacetamido)benzamido]-4-thiocyano-5-pyrazolone
5. 1-(p-tert-butylphenoxyphenyl)-3-α-(p-tert-butylphenoxy)-propionamido-4-thiocyano-5-pyrazolone
6. 1-(2,4,6-trichlorophenyl)-3-pentadecyl-4-sulfo-5-pyrazolone
7. 1-(2,4,6-trichlorophenyl)-3-pentadecyl-4-chloro-5-pyrazolone
8. 1-[4-(3,5-dimethoxybenzamido)phenyl]-3-ethoxy-4-(3-octadecylcarbamylphenylthio)-5-pyrazolone Typical four-equivalent cyan-forming phenolic couplers which can be used in this invention include:

1. 5-(p-amylphenoxybenzenesulfonamino)-1-naphthol
2. 5-(n-benzyl-N-n-valerylamino)-1-naphthol
3. 5-caproylamino-1-naphthol
4. 2-chloro-5-(N-n-valeryl-N-p-isopropylbenzylamino)-1-naphthol
5. 2-chloro-5-palmitylamino-1-naphthol
6. 5-diphenylethersulfonamido-1-naphthol
7. 1-hydroxy-2-(N-isoamyl-N-phenyl)naphthamide
8. 8-hydroxy-1-α-naphthoyl-1,2,3,4-tetrahydroquinoline
9. 1-naphthol-5-octyl-cyclohexylamide
10. 5-phenoxyacetamino-1-naphthol
11. Monochlor-5-(N-γ-phenylpropyl-N-p-sec.-amylbenzoyl-amino)-1-naphthol
12. 2-benzoylamino-3,5-dimethylphenol
13. 2-α-(p-tert-amylphenoxy)-n-butyrylamino-5-methylphenol
14. 1-hydroxy-N-[δ-(2,4-di-tert.-amylphenoxy)-butyl]-2-naphthamide
15. 2-(4-tert.-amyl-3-phenoxybenzoylamino)-3,5-dimethylphenol
16. 2-(4-tert.-amyl-3-phenoxybenzoylamino)phenol
17. 2-[α-(4'-tert.-butylphenoxy)propionylamino]-phenol
18. 2-[N-methyl-N-(4-tert.-amyl-3-phenoxybenzoylamino)]phenol 19. 2-α-(4-tert.-amylphenoxy)butyrylamino-1-phenol
20. 2-(4-tert.-amyl-3-phenoxybenzoylamino)-3,5-dimethylphenol
21. 2-[α-(4-tert.-amylphenoxy)-n-butyrylamino]-5-methylphenol
22. 3-(4-tert.-amyl-3'-phenoxybenzoylamino)phenol
23. 2-[α-(4-tert.-amylphenoxy)-n-butyrylamino]-6-chlorophenol
24. 3-[α-(4-tert.-amylphenoxy)-n-butyrylamino]-5-chlorophenol
25. 5-benzene sulfonamido-1-naphthol
26. 2-chloro-5-benzenesulfonamido-1-naphthol
27. 5-(1,2,3,4-tetrahydronaphthalene-6-sulfonamido)-1-naphthol
28. 2-chloro-5-(4-bromodiphenyl-4-sulfonamido)-1-naphthol Any of the two-equivalent cyan-forming phenolic couplers can be used in the practice of this invention. The two-equivalent couplers can be derived from the corresponding four-equivalent phenolic couplers by substituting a nonchromophoric coupling off group on the carbon in the 4-position of the phenolic or naphthoic ring. Included among the coupling off groups are the acyloxy group illustrated by the 4-acyloxyphenols and 4-acyloxynaphthols of Loria U.S. Pat. No. 3,311,476, issued Mar. 28, 1967, the cyclooxy group illustrated by the 4-cyclooxy naphthols of Loria U.S. Pat. application 483,807, filed Aug. 30, 1965, the thiocyano group illustrated by the 4-thiophenols and 4-thionaphthols of Loria U.S. Pat. No. 3,253,294, the cyclic imido groups as illustrated by the 4-cyclic imido derivatives of 1-hydrogen-2-naphthamides of Loria U.S. Pat. application 504,994, the chlorine atom as illustrated in the 4-chlorophenols of Weissberger U.S. Pat. No. 2,423,730, the alkoxy groups as illustrated by the 4-alkoxynaphthols (and naphthols) of Whitmore et al. U.S. Pat. No. 3,227,550, the sulfo group as in 4-sulfophenols and 4-sulfonaphthols, etc.

Typical two-equivalent cyan-forming couplers which can be used in this invention include the following:

1. 1-hydroxy-4-decyloxy-2-naphthamide
2. 1-hydroxy-4-acetoxy-N-[α-(2,4-di-tert-amylphenoxy)butyl]-2-naphthamide
3. 1-hydroxy-4-methoxy-N-octadecyl-3',5'-dicarboxy-2-naphthanilide
4. 1-hydroxy-4-thiocyano-N-[α-2,4-di-tert-amylphenoxy)-butyl]-2-naphthamide
5. 1-hydroxy-4-(pentafluorophenoxy)-N-{β-{4-[α-(2,4-di-tert-amylphenoxy)acetamido]phenyl}ethyl}-2-naphthamide
6. 1-hydroxy-4-(4-nitrophenoxy)-N-[α-2,4-di-tert-amylphenoxy)butyl]-2-naphthamide
7. 1-hydroxy-4-(4-chlorophenoxy)-2'-tetradecyloxy-2-naphthanilide The photographic image-forming coupler is used at a sufficient concentration to give a dye image of suitable density. The concentration employed will depend on the characteristics of the dye formed by the coupler, and on the nature of the photographic emulsion in which it is incorporated. The photographic image-forming coupler preferably is nondiffusible, and colorless. It can be a coupler of the type which forms a diffusible dye image (which can be transferred to a suitable receiving sheet) or a type which forms nondiffusible dye images. The invention is useful with all photographic incorporated image forming couplers which form dye images by imagewise reaction with oxidizing primary aromatic amine color-developing agent. "Incorporated" refers to silver halide emulsion layers containing photographic image-forming couplers at the time of exposure.

Photographic couplers which form cyan dye images are especially useful in the practice of this invention. However, couplers which form other colored images, such as magenta or yellow dye images, can also be utilized with good results. The couplers utilized in the image-recording layers can produce dyes of essentially the same color or they can have incorporated therein photographic couplers which produce different dye images.

The term "development inhibitor-releasing coupler" is used herein as a word of art to refer to those photographic couplers which, upon reaction with oxidized primary aromatic amine color-developing agent, form dye and release a compound which inhibits development. Development inhibitor-releasing (DIR) couplers which can be utilized herein can be represented by the general formula:

$$ZC_p$$

wherein $C_p$ represents a photographic coupler radical, preferably an open-chain ketomethylene, 5-pyrazolone or phenolic (including alpha-naphtholic) coupler radicals, having said Z substituted in the coupling position of the coupler radical, Z representing an organic group which does not contain a chromophore, does not couple with oxidized primary aromatic amine color developer to form dye, does not inhibit development while attached to Cp, but is released from Cp, on reaction with oxidized primary aromatic amine color-developing agent, and either is or forms a compound which inhibits development. Especially useful DIR couplers have Formula I, II or III above, wherein $Y_1$, $Y_2$ and $Y_3$ each are selected from:

1. a monothio group, such as, ortho-nitro or ortho-amino substituted arylmonothio groups (such as, 2-nitrophenyl and 2-aminophenyl), a carbon containing heterocyclic monothio group (generally having a five- to six-membered ring containing at least one heteronitrogen, oxygen or sulfur atom and preferably one to four heteronitrogen atoms) including heterocyclic radicals, such as tetrazolyls, triazinyls, triazolyls, oxazolyls, oxadiazolyls, diazolyls, thiazyls, thiadiazolyls, benzoxazolyls, benzothiazolyls, pyrimidyls, pyridinyl, quinolinyls, etc., and in which the aryl, heterocyclic-moieties of the monothio group are either unsubstituted or substituted with various groups, such as nitro, halogen (chlorine, bromine, iodine, fluorine), lower alkyl, lower alkylamido, lower alkoxy, lower alkylsulfonamido, α-chloroacetylthio, lower alkylcarbamylamino, etc., typical monothio groups representing the above include 2-aminophenyl, 2-nitrophenyl and a heterocyclic group (e.g., 2-benzothiazolylthio, 1-phenyl-5-tetrazolylthio, 1-(4-carbomethoxyphenyl)-5-tetrazolylthio, 5-phenyl-1,3,4-oxadiazolyl-2-thio, 2-phenyl-5-(1,3,4)-oxadiazolythio, 2-benzoxazolylthio, etc.);
2. a 2-aminoarylazoxy group (e.g., 2-amino-4-methyl-phenylazoxy, 2-aminophenylazoxy, 2-amino-4-chlorphenylazoxy, etc.);
3. a 2-amidoarylazoxy group (e.g., 2-acetamido-phenylazoxy, 2-acetamido-4-methylphenylazoxy, 2-acetamido-4-chlorophenylazoxy, 2-palmitamido-phenylazoxy, 4-methoxy-2-palmitamido-phenylazoxy, 4-chloro-2-palmitamidophenyl-azoxy, etc.);
4. a 2-aryltriazolyl group (e.g., 2-benzotriazolyl, 5-chloro-2-benzotriazolyl, 5-hydroxy-2-benzotriazolyl, 4,7-dinitro-2-benzotriazolyl, 5-methyl-2-benzotriazolyl, 6-methoxy-2-benzotriazolyl-4-carboxyethyl-2-benzotriazolyl, 4-sulfoethyl-2-benzotriazolyl, 2-naphthotriazolyl, 4-methyl-2-naphthotriazolyl, 5-chloro-2-naphthotriazolyl 5-hydroxy-2-naphthotriazolyl, 5-nitro-2-naphthotriazolyl, 5-sulfoethyl-2-naphthotriazolyl, 4-amino-2-naphthotriazolyl, benzo[1,2-d:4,5-d']-bistriazolyl, etc.).

The Z group (or $Y_1$, $Y_2$ and $Y_3$ in the above formulas) (1) forms a diffusible mercaptan and (2), (3) and (4) form a diffusible aryltriazole upon reaction with oxidized color developing agent.

Representative DIR couplers include the following:

1. α-Benzoyl-α-(2-nitrophenylthio)-4-[N-ν-phenylpropyl)-N-(p-tolyl)-sulfamyl]acetanilide
2. α-Benzoyl-α-(2-benzothiazolylthio)-4-[N-(γ-phenylpropyl)-N-(p-tolyl)sulfamyl]acetanilide
3. α-{3-[α-(2,4-di-tert-amylphenoxy)butyramido]-benzoyl}-α-2-nitrophenylthio-2-methoxyacetanilide
4. α-{3-[ν-(2,4-di-tert-amylphenoxy)butyramido]-benzoyl}-α-(2-benzoxazolylthio)-2-methoxyacetanilide
5. α-Benzoyl-α-[1-(3-phenyl)-5-tetrazolylthio]-stearamido acetanilide
6. α-{3-[α-(2,4-di-tert-amylphenoxy)butyramido]-benzoyl}-α-(2-aminophenylazoxy)-2-methoxyacetanilide
7. α-{3-[γ-(2,4-di-tert-amylphenoxy)butyramido]-benzoyl}-α-(2-amino-4-methylphenylazoxy)-2-methoxyacetanilide
8. α-(5-Chloro-2-benzotriazolyl)-α-pivalyl-5[α-(2,4-di-tert-amylphenoxy)propylamido]-2-chloroacetanilide
9. α-(4,7-Dinitro-2-benzotriazolyl)-α-pivalyl-3,6-dichloro-4-(N-methyl-N-octadecysulfamyl-)acetoacetanilide
10. α-(6-Chloro-5-methoxy-2-benzotriazolyl)-α-pivalyl-2-chloro-5-[α-(3-pentadecyl-4-sulfophenoxy)-butyramido]acetanilide, sodium salt
11. 1-Phenyl-3-octadecylamino-4-[2-phenyl-5-(1,3,4)-oxadiazolylthio]-5-pyrazolone
12. 1-{4-[γ-(2,4-di-tert-amylphenoxy)butyramido]-phenyl}-3-ethoxy-4-(1-phenyl-5-tetrazolylthio)-5-pyrazolone
13. 1-{4-[α-(3-pentadecylphenoxy)butyramido]phenyl}-3-ethoxy-4-(1-phenyl-5-tetrazolylthio)-5-pyrazolone
14. 1-(2,4,6-trichlorophenyl)-3-{4-[α-(2,4-di-tert-amylphenoxy)butyramido]anilino}-4-(1-phenyl-5-tetrazolylthio)-5-pyrazolone
15. 1-Phenyl-3-octadecylamino-4-(1-phenyl-5-tetrazolylthio-5-pyrazolone
16. 1-[4-(4-tert-butylphenoxy)phenyl]-3-phenyl-4-(1-phenyl-5-tetrazolylthio)-5-pyrazolone
17. 1-[4-(4-tert-butylphenoxy)phenyl]-3-[α-(4-tert-butylphenoxy)propionamido]-4-(5-phenyl-1,3,4-oxadiazolyl-2-thio)-5-pyrazolone
18. 1-[4-(4-tert-butylphenoxy)phenyl]-3-[α-(4-tert-butylphenoxy)propionamido]-4-(2-nitrophenylthio)-5-pyrazolone
19. 1-[4-(4-tert-butylphenoxy)phenyl]-3-[α-(4-tert-butylphenoxy)propionamido]-4-[1-(4-methoxyphenyl)-5-tetrazolylthio]-5-pyrazolone 20. 1-[4-(4-tert-butylphenoxy)phenyl]-3-[α-(4-tert-butylphenoxy)propionamido]-4-(2-benzothiazolylthio)-5-pyrazolone
21. 1-[4-(4-tert-butylphenoxy)phenyl]-3-[α-(4-tert-butylphenoxy)propionamido]-4-(2-nitrophenylthio)-5-pyrazolone
22. 1-[4-(4-tert-butylphenoxy)phenyl]-3-[α-(tert-butylphenoxy)propionamido]-4-(2-benzoxazolylthio)-5-pyrazolone
23. 1-(2,4-dichloro-6-methoxyphenyl)-3-[α-(3-pentadecylphenoxy)-acetamido]-4-(1-phenyl-5-tetrazolylthio)-5-pyrazolone
24. 1-Phenyl-3-octadecyl-4-(1-phenyl-5-tetrazolylthio)-5-pyrazolone
25. 1-Phenyl-3-[α-(2,4-di-tert-amylphenoxy)acetamido]-4-(1-phenyl-5-tetrazolylthio)-5-pyrazolone
26. 1-Phenyl-3-[γ-(2,4-di-tert-amylphenoxy)-butyramido]-4-(1-phenyl-5-tetrazolylthio)-5-pyrazolone
27. 1-Phenyl-3-(3,5-didodecyloxybenzamido)-4-(2-nitrophenylthio)-5-pyrazolone
28. 1-Phenyl-3-[α-(2,4-di-tert-amylphenoxy)acetamido]-4-(2-aminophenylazoxy)-5-pyrazolone
29. 4-Benzotriazolyl-3-pentadecyl-1-phenyl-5-pyrazolone
30. 4-Benzotriazolyl-1-(2,4,6-trichlorophenyl)-3-[3-α-(2,4-di-t-amylphenoxy)acetamido benzamido]-5-pyrazolone
31. 4-(5-Methoxy-2-benzotriazolyl)-3-pentadecyl-1-phenyl-5-pyrazolone
32. 4-(4-Carboxy-2-benzotriazolyl)-1-(2,4,6-trichlorophenyl)-3-pentadecyl-5-pyrazolone
33. 1-Hydroxy-4-(2-nitrophenylthio)-N-[δ-(2,4-di-tert-amylphenoxy)butyl]-2-naphthamide
34. 1-Hydroxy-4-(2-benzothiazolylthio)-N-[δ-(2,4-di-tert-amylphenoxy)butyl]-2-naphthamide
35. 1-Hydroxy-4-(1-phenyl-5-tetrazolylthio)-N-[δ-(2,4-di-tert-amylphenoxy)butyl]-2-naphthamide
36. 1-Hydroxy-4-(2-benzothiazolylthio)-N-octadecyl-3',5'-dicarboxy-2-naphthanilide
37. 1-Hydroxy-4-(1-phenyl-5-tetrazolylthio)-2'-tetradecyloxy-2-naphthanilide
38. 1-Hydroxy-4-[1-(4-methoxyphenyl)-5-tetrazolylthio]-N-[δ-(2,4-di-tert-amylphenoxy)butyl]-2-naphthamide
39. 1-Hydroxy-4-(5-phenyl-1,3,4-oxadiazolyl-2-thio)-N-[δ-(2,4-di-tert-amylphenoxy)butyl]-2-naphthamide
40. 5-Methoxy-2-[α-(3-n-pentadecylphenoxy)-butyramido]-4-(1-phenyl-5-tetrazolylthio)phenol
41. 1-Hydroxy-4-(2-amino-4-methylphenylazoxy-N-[δ-(2,4-di-tert-amylphenoxy)butyl]-2-naphthamide
42. 4-(2-Benzotriazolyl)-2-[δ-(2,4-diamylphenoxybutyl)]-1-hydroxynaphthamide
43. 1-Hydroxy-4-(6-nitro-2-benzotriazolyl)-N-[δ-(2,4-di-t-amylphenoxy)butyl]-2-naphthamide
44. 5-Methoxy-2-[α-(3-pentadecylphenoxy)-butyramido]-4-(5-chloro-2-benzotriazolyl)phenol
45. 5-Methoxy-2-[α-(3-pentadecylphenoxy)-butyramido]-4-(6-chloro-5-methoxy-2-benzotriazolyl)phenol Couplers 1 through 5, 11 through 27, 33 through 40 are described in Barr U.S. Pat. No. 3,227,554. Couplers 6, 7, 28 and 41 are prepared by methods similar to those disclosed in U.S. Pat. No. 3,148,062. Couplers 8 through 10, 29 through 32 and 42 through 45 are described by Sawdey U.S. Pat. application Ser. No. 674,090, filed Oct. 10. 1967. The couplers referred to in the immediate paragraph are the DIR couplers listed above.

The most useful DIR couplers are those which have a monothio group in the coupling position (e.g., Formula I, II and III above in which $Y_1$, $Y_2$ and $Y_3$ represent a monothio group). Preferred DIR couplers have Formula I, II or III above wherein $Y_1$, $Y_2$ and $Y_3$ each represents a heterocyclic monothio radical in which the heterocyclic ring has from five to six atoms and at least one hetero atom selected from oxygen, sulfur and nitrogen, such as hetero ring, containing from one to four heteronitrogen atoms, e.g., a 5-tetrazolylthio group. Preferably, a DIR coupler is selected which forms a dye of substantially the same color as the dye formed by the image forming coupler.

The development inhibitor-releasing coupler is used at a concentration sufficient to effectively provide the desired extended latitude low-contrast shoulder. The optimum concentration of the development inhibitor-releasing coupler will depend on whether a nonimage-forming silver halide layer is utilized contiguous to the slow silver halide emulsion layer, as well as upon the characteristics of the silver halide emulsion layer, the development inhibitor-releasing coupler itself and other variables. As a general guideline, good results can be obtained when about 1 to 50 mg. per square foot of development inhibitor-releasing coupler are utilized. Preferably, the fast emulsion layer is free from DIR coupler.

A nonimage-forming hydrophilic colloid silver halide layer can be utilized in the elements of this invention intermediate the support and the image-recording silver halide emulsion layers. Advantageously, the nonimage-recording silver halide emulsion layer comprises silver halide grains which have an average diameter of about 0.1 to about 1 micron. This relatively fine grained emulsion can be coated at various thicknesses, as from about 10 to 40 microns, to reduce image spread. Utilization of such layers to reduce image spread is described and claimed in Millikan U.S. Pat. application Ser. No. 648,237 filed June 23, 1967, and entitled "Photographic Elements and Methods." Such layers appear to function as a light-diffusing layer. During processing, the silver halide in those layers can be removed in any suitable manner, such as with a silver halide solvent, e.g., sodium thiosulfate. Advantageously, such nonimage-forming silver halide emulsion layers are free from any light-diffusing material, such as starch, which cannot be readily removed. These layers can in addition contain filter material, such as suitable dyes which absorb green and red radiation. This further reduces image spread when the elements are spectrally sensitized and are exposed to radiation longer than blue wavelength radiation. Such techniques are described and claimed in Millikan U.S. Pat. application Ser. No. 729,432 filed May 15, 1968, and now U.S. Pat. 3,591,382, allowed July 6, 1971, which is a continuation-in-part of the Millikan application referred to above.

It is also useful in some instances to employ an antihalation layer, preferably on the same side of the support as the image-recording emulsion layers. It is desirable to coat the antihalation layer on the same side of the support as the emulsion layers to obtain the desired reduction in image spread. Any suitable antihalation material can be employed. For example, dyes can be used, preferably those which absorb the longest wavelengths of radiation to which the emulsion is sensitive. The dyes should be decolorizable during processing, e.g., in sulfite solution. A large number of dyes which can be used in antihalation layers are described in Jones et al. U.S. Pat. No. 3,282,699, issued Nov. 1, 1966. Also useful as antihalation layers are colloidal silver layers such as neutral (gray) colloidal silver dispersed in a suitable colloid such as gelatin. Bleachable dyes are especially useful. The emulsion can contain azaindenes as described in Knott U.S. Pat. No. 2,933,388, benzothiazolium compounds as described in Allen and Wilson U.S. Pat. No. 2,694,716 or a thioether as described in U.S. Pat. No. 3,046,132.

The binder for the silver halide in the layers utilized herein can be any of the usual photographic binders. Gelatin is a highly useful and preferred binder. Other binders which can be employed herein with good results are described and referred to in Column 13 of Beavers U.S. Pat. No. 3,039,873 issued June 19, 1962. In addition to such binders, also useful are binders of the type disclosed in U.S. Pat. Nos. 3,142,568; 3,193,386; 3,062,674 and 3,220,844, including the water-insoluble polymers of alkyl acrylates and methacrylates, acrylic acid, sulfoalkyl acrylates or methacrylates and the like.

The following example is included for a further understanding of this invention.

EXAMPLE

A photographic element in accordance with this invention is prepared having the composition given below, concentration being in mg. per square foot:

| | | | |
|---|---|---|---|
| Layer 5 | Gelatin | 82 m.g. | Overcoat |
| Layer 4 | Gelatin | 300 | High speed Pan sensitized |
| | Cyan Coupler* | 22 | AgBrI gelatin emulsion |
| | Ag | 200 | |
| Layer 3 | Gelatin | 82 | Barrier Layer |
| Layer 2 | Gelatin | 263 | |
| | Cyan Coupler* | 60 | Slower speed, Pan sensitized |
| | DIR Coupler** | 12 | AgBrI gelatin emulsion |
| | Ag | 200 | |
| Layer 1 | Gelatin | 1000 | Unsensitized |
| | Ag | 500 | AgBrI gelatin emulsion |
| | | | Support |

*1-hydroxy-2-[8(2',4'-di-tert-amylphenoxy)-N-butyl]-naphthamide

**1-hydroxy-4-(1-phenyl-5-tetrazolylthio)-2[Δ-(2,4-di-tert-amylphenoxy)-N-butyl]naphthamide.

Layer 4 contains a fast silver bromoiodide (94:6) negative emulsion that is panchromatically sensitized and contains a cyan-dye-forming coupler of the type described in U.S. Pat. No. 2,474,293 as Compound No. 1. Layer 3 comprises a gelatin interlayer to prevent interlayer dye contamination resulting from oxidized developer wandering. Layer 2 contains a panchromatically sensitized silver bromoiodide (97:3) negative emulsion which is about 0.6 Log E slower in speed than the silver halide emulsion used in Layer 4 and also containing a cyan-dye-forming coupler as in Layer 4 plus a mercaptan releasing compound as described in U.S. Pat. No. 3,227,554 as Compound No. 11. Layer 1 comprises an unsensitized nonimage-forming silver bromoiodide (94:6) emulsion having grains less than about 1 micron in diameter, such as an emulsion of the type described in Millikan U.S. application Ser. No. 648,237, filed June 23, 1967. The element is exposed for one-fifth second in a sensitometer and processed by development for 15 minutes with primary aromatic amino color-developing agent. The color development process used is described in detail by Millikan in example 1 of Canadian Pat. No. 726,137 issued Jan. 18, 1966. The processed film has a 5 log E exposure latitude, and exhibits low-image spread. The film provides a low-contrast record of bright images and a high-contrast record of faint images. It is well suited for directly recording and measuring the events which occur when a satellite in orbit reenters the earth's atmosphere and burns out. When this example is repeated, except that the DIR coupler is not used, there is an undesirable increase in the contrast of the bright image, the lattitude of the faster emulsion layer is too low, and, the record produced by a bright image obliterates the record produced by a faint image in close geometrical proximity to the bright image.

The invention has been described in detail with particular reference to preferred embodiments thereof, but, it will be understood that variations and modifications can be effected within the spirit and scope of the invention described hereinabove and in the appended claims.

We claim:

1. A photographic element comprising a support having coated thereon:

a. a first photographic silver halide emulsion layer containing (1) nondiffusible photographic coupler which forms image dye and (2) a development inhibitor-releasing photographic coupler; and, b. a second photographic silver halide emulsion layer containing nondiffusible photographic coupler which forms image dye, said second layer having a faster effective speed sensitivity than said first layer.

2. A photographic element as defined in claim 1 wherein each of said couplers has one of the following structural formulas:

Formula I

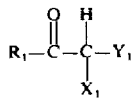

Formula II

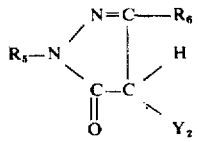

Formula III

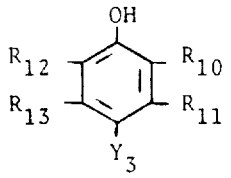

wherein $R_1$, $X_1$, $R_5$, $R_6$, $R_{10}$, $R_{11}$, $R_{12}$ and $R_{13}$ each represents a group of the type employed in, respectively, open-chain ketomethylene couplers, 5-pyrazolone couplers, and phenolic couplers; and $Y_1$, $Y_2$ and $Y_3$ each represents:

a. a member selected from the group consisting of hydrogen and a colorless coupling-off group to complete said image-forming coupler; [ and ] *or* b. a colorless group to complete said development inhibitor-releasing coupler.

3. A photographic element as defined in claim 1 wherein each of said couplers has one of the following structural formulas:

Formula I

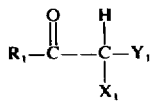

Formula II

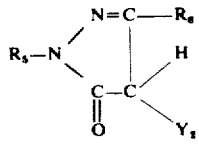

Formula III

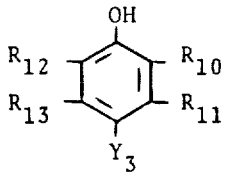

wherein $R_1$ and $R_5$ each represents a member selected from the group consisting of alkyl, aryl, and a heterocyclic group containing at least one carbon atom selected from oxygen, sulfur and nitrogen; $X_1$ represents a member selected from the group consisting of cyano and carbamyl; $R_6$ represents a member selected from the group consisting of alkyl, carbamyl, amino, amido, benzamido, and alkamido; $R_{10}$ and $R_{11}$ each represents a member selected from the group consisting of hydrogen, alkyl, aryl, a heterocyclic group containing at least one hetero atom selected from oxygen, sulfur and nitrogen, amino, carbonamido, sulfonamido, sulfamyl, carbamyl, halogen, and alkoxy; $R_{12}$ and $R_{13}$ when taken together, represents the atoms required to complete a benzo group, and when taken separately, each represents a value selected from those given for $R_{10}$ and $R_{11}$; and, said $Y_1$, $Y_2$ and $Y_3$ each represents:

a. a member selected from the group consisting of hydrogen, halogen, a thiocyano group, an acyloxy group, an aryloxy group, a cyclooxy group, and, when said $R_{12}$ and $R_{13}$ represent the atoms to complete a benzo group, $Y_3$ represents any of the foregoing groups given for $Y_1$ and $Y_2$ except aryloxy, and can in addition represent a cycloimido group, to complete said photographic image forming coupler; [ and ] *or* b. a monothio group selected from an orthoamino-substituted arylmonothio group; an orthonitro-substituted arylmonothio group; and, a heterocyclic radical containing at least one hetero atom selected from oxygen, sulfur and nitrogen, to complete said development inhibitor-releasing coupler.

4. A photographic element as defined in claim 3 wherein said $Y_1$, $Y_2$ and $Y_3$ each represents a heterocyclic monothio radical containing from one to four heteronitrogen atoms, to complete said development inhibitor-releasing coupler.

5. A photographic element as defined in claim 4 wherein said $Y_1$, $Y_2$ and $Y_3$ each represents a member selected from the group consisting of: a 2-nitrophenylthio group; a 2-aminophenylthio group; a 5-tetrazolylthio group; a 2-benzothiazolylthio group; and, a 5-phenyl-1,3,4-oxadiazolylthio group, to complete said development inhibitor-releasing coupler.

6. A photographic element as defined in claim 3 wherein said second photographic silver halide emulsion layer produces an effective speed which is about 0.6 Log E faster than the effective speed of said first photographic silver halide emulsion.

7. A photographic element as defined in claim 3 wherein said photographic silver halide emulsion layers and said support are separated by a nonimage-recording emulsion layer comprising silver halide grains which have an average diameter of less than about 1 micron.

8. A photographic element as defined in claim 7 wherein said nonimage-recording silver halide emulsion layer is coated at a thickness of from about 10 to 40 microns.

9. A photographic element comprising a support having coated thereon, in the order given:

a. an unsensitized, nonimage-recording layer comprising gelatin having dispersed therein silver bromoiodide grains having an average diameter of about 0.1 to 1 micron;

b. a first panchromatically sensitized photographic gelatin silver bromoiodide emulsion layer containing the cyan image-forming coupler 1-hydroxy-2-[Δ(2',4'-di-tert-amylphenoxy)-N-butyl]-naphthamide and the development inhibitor-releasing coupler 1-hydroxy-4-(1-phenyl-5-tetrazolylthio)-2-[Δ-(2,4-di-tert-amyl-phenoxy)-N-butyl]naphthamide; and, c. a second panchromatically sensitized photographic gelatin silver bromoiodide emulsion layer containing the cyan image forming coupler 1-hydroxy-2-[Δ(2',4'-di-tert-amylphenoxy)-N-butyl]-naphthamide, which layer produces an effective speed of about 0.6 Log E faster than said first silver halide emulsion layer.

10. A photographic element as defined in claim 3 wherein said photographic silver halide layers and said support are separated by a photographic antihalation layer.

*11. A photographic element as in claim 1, wherein said second layer is free of development inhibitor-releasing photographic coupler.*

*12. A photographic element as in claim 11, wherein the amount of said non-diffusible photographic coupler which forms image dye in said second layer is smaller than the amount of said non-diffusible photographic*

*coupler which forms image dye in said first layer.*

*13. A photographic element as in claim 3, wherein said second layer is free of development inhibitor-releasing photographic coupler.*

*14. A photographic element as in claim 13, wherein the amount of said non-diffusible photographic coupler which forms image dye in said second layer is smaller than the amount of said non-diffusible photographic coupler which forms image dye in said first layer.*

*15. A photographic element as in claim 5, wherein said second layer is free of development inhibitor-releasing photographic coupler.*

*16. A photographic element as in claim 15, wherein the amount of said non-diffusible photographic coupler which forms image dye in said second layer is smaller than the amount of said non-diffusible photographic coupler which forms image dye in said first layer.*

*17. A photographic element comprising a support having coated thereon*

*a. a first photographic silver halide emulsion layer containing (1) nondiffusible photographic coupler which forms image dye and (2) a development inhibitor-releasing photographic coupler; and,*

*b. a second photographic silver halide emulsion layer containing nondiffusible photographic coupler which forms image dye, said second layer having a faster effective speed sensitivity than said first layer,*

*wherein each of said couplers has one of the following structural formulas:*

Formula I

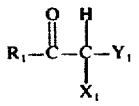

Formula II

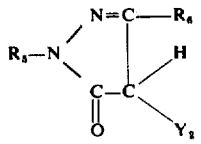

Formula III

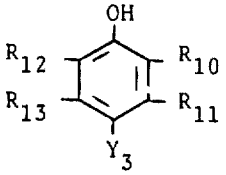

*wherein $R_1$, $X_1$, $R_5$, $R_6$, $R_{10}$, $R_{11}$, $R_{12}$ and $R_{13}$ each represents a group of the type employed in, respectively, open-chain ketomethylene couplers, 5-pyrazolone couplers, and phenolic couplers; and $Y_1$, $Y_2$ and $Y_3$ each represents:*

*a. a member selected from the group consisting of hydrogen and a colorless coupling-off group to complete said image-forming coupler, or*

*a colorless group to complete said development inhibitor-releasing coupler;*

*said second emulsion layer being substantially free of development inhibitor-releasing photographic coupler, said second emulsion layer being contiguous to said first emulsion layer and being positioned closer than said first emulsion layer to said support, and the effective speed of said second emulsion layer being from about 0.6 log E to about 1.2 log E faster than that of said first emulsion layer.*

*18. A photographic element as in claim 17, wherein said development inhibitor-releasing photographic coupler forms, upon reaction with oxidized color developer, a dye of the same color as said image dye; the amount of said development inhibitor-releasing photographic coupler in said first emulsion layer being from about 1 to about 10 mg per square foot.*

*19. A photographic element as in claim 18, wherein the amount of said non-diffusible photographic coupler which forms image dye in said second layer is smaller than amount of said non-diffusible photographic coupler which forms image dye in said first layer.*

*20. A photographic element as in claim 18, wherein the amount of said non-diffusible photographic coupler which forms image dye in said first layer is about three times the amount of said non-diffusible photographic coupler which forms image dye in said second layer.*

*21. A photographic element as defined in claim 18, wherein said $Y_1$, $Y_2$ and $Y_3$ each represents a heterocyclic monothio radical containing from one to four heteronitrogen atoms, to complete said development inhibitor-releasing coupler.*

*22. A photographic element as defined in claim 21, wherein said $Y_1$, $Y_2$ and $Y_3$ each represents a member selected from the group consisting of: a 2-nitrophenylthio group; a 2-aminophenylthio group; a 5-tetrazolylthio group; a 2-benzothiazolylthio group; and a 5-phenyl 1,3,4-oxadiazolylthio group, to complete said development inhibitor-releasing coupler.*

*23. A photographic element as defined in claim 18, wherein said photographic silver halide emulsion layers and said support are separated by a nonimage-recording emulsion layer comprising silver halide grains which have an average diameter of less than about 1 micron.*

*24. A photographic element as defined in claim 23, wherein said nonimage-recording silver halide emulsion layer is coated at a thickness of from about 10 to 40 microns.*

*25. A photographic element as in claim 18, wherein said photographic silver halide layers and said support are separated by a photographic antihalation layer.*

* * * * *

UNITED STATES PATENT AND TRADEMARK OFFICE

CERTIFICATE OF CORRECTION

PATENT NO. : Reissue No. 28,760

DATED : April 6, 1976

INVENTOR(S) : John C. Marchant and Robert F. Motter

It is certified that error appears in the above-identified patent and that said Letters Patent are hereby corrected as shown below:

Column 2, line 43, after "prior art" insert --for--;
Column 4, line 67, "having" should be --have--;
Column 10, line 18, "[N-ν-phenyl-" should be --[N-γ-phenyl---;

Column 10, line 25, "α-{3[ν-" should be --α-{3[γ---;

Column 11, line 29, before "α" insert --{-- and after "acetamido" insert --}--;

Column 16, line 46, "[Δ" should be --[8--; and

Column 16, line 54, "[Δ" should be --[8--.

Signed and Sealed this

Thirty-first Day of August 1976

[SEAL]

*Attest:*

RUTH C. MASON
*Attesting Officer*

C. MARSHALL DANN
*Commissioner of Patents and Trademarks*